Oct. 1, 1968  J. DIDWALL  3,404,325
PROPORTIONAL MOTOR CONTROL ARRANGEMENT
Filed Sept. 1, 1965  2 Sheets-Sheet 1

INVENTOR.
JOSEPH DIDWALL
BY
Walter G. Finch
ATTORNEY

INVENTOR.
JOSEPH DIDWALL
BY Walter G. Finch
ATTORNEY 3,404,325
PROPORTIONAL MOTOR CONTROL
ARRANGEMENT
Joseph Didwall, Loreley Beach Road,
White Marsh, Md. 21162
Filed Sept. 1, 1965, Ser. No. 484,237
1 Claim. (Cl. 318—208)

ABSTRACT OF THE DISCLOSURE

A motor control arrangement utilizing the instant switching action of silicon controlled rectifiers to close the appropriate shading coil circuit for a reversible induction motor. The anodes of the rectifiers are powered through a direct connection to the shading coils where a voltage is reduced by transformer action from the motor running coil.

---

This invention relates generally to electric motor control devices, and more particularly it pertains to a system for more accurately plugging positioning motors.

The operation of braking an electric motor by arranging the connections so it tends to run in the reverse direction is widely used for positioning mechanical devices. Often the circuiting is arranged with supplemental feedback from the motor so the system is responsive to an introduced error signal which may be very small. Thus, there is a magnification of any positioning inaccuracies and often jitter and erratic operation of oscillation nature occurs and is difficult to overcome.

An object of the present invention is to provide a proportional motor control arrangement which uses silicon control rectifiers in conjunction with induction motors of the shaded coil type wherein the control increments of forward and reverse as well as hold are measured in fractions of a power line frequency cycle.

Another object of the invention is to provide an electrical circuit arrangement which uses the rectifying properties of a silicon controlled rectifier (SCR) as an electrical brake for a motor.

Still another object of the invention is to provide an improved circuit for positioning a motor in accordance with a small command signal.

Other objects and attendant advantages of this invention will become more readily apparent and understood from the following detailed specification and accompanying drawings in which.

Figure 3:
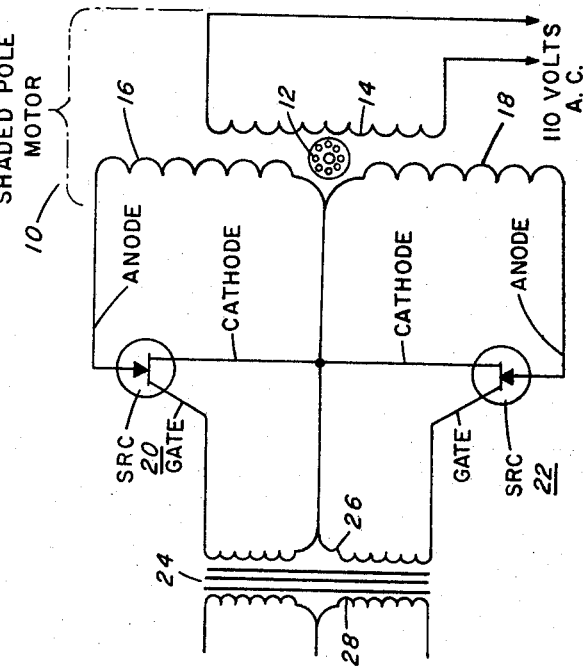
FIG. 3 is the right hand portion of FIG. 2 enlarged for explanatory purposes.

With reference now to FIG. 3 of the drawings, a shaded pole motor is shown by reference numeral 10. This motor 10 has an induction type armature 12 and a field or running coil 14. Such a motor 10 will only start and run if a shorted one turn or more copper shading winding is incorporated into the pole pieces of the running coil 14.

If two such shading windings are suitably placed on the pole pieces and their leads brought out, a short circuit on one coil will cause the motor 10 to start and run in a forward direction. Conversely, a short circuit on the other coil will cause reverse starting and running of the motor 10.

The forward shading winding 16 for purposes of this invention is brought to the anode and cathode terminals of a silicon controlled rectifier or SCR 20. The reverse shading winding 18 is similarly connected to another SCR 22. The running coil 14 is connected to a source of AC power as shown. The anode-to-cathode voltage for each SCR 20 and 22 is solely that AC voltage induced from the running coil 14 into the respective shading windings 16 and 18 of the motor 10 and is insufficient to breakdown the SCR's 20 and 22.

A pushpull transformer 24 is provided which has a center tapped output winding 26. One end of this winding 26 is connected to the gate terminal of SCR 20, the other end to the gate terminal of SCR 22. The cathodes of both SCR's 20 and 22 are connected together and also connect to the center tap of output winding 26.

When a symmetrical AC signal or an alternate positive and negative going pulse is introduced to the primary 28, it swings the ends of the center-tapped output winding 26 alternately positive and negative. When the resulting positive gate-to-cathode rigger current flows in an SCR 20 or SCR 22, it "fires" and conducts while a positive potential exists across anode-to-cathode.

Figure 2:
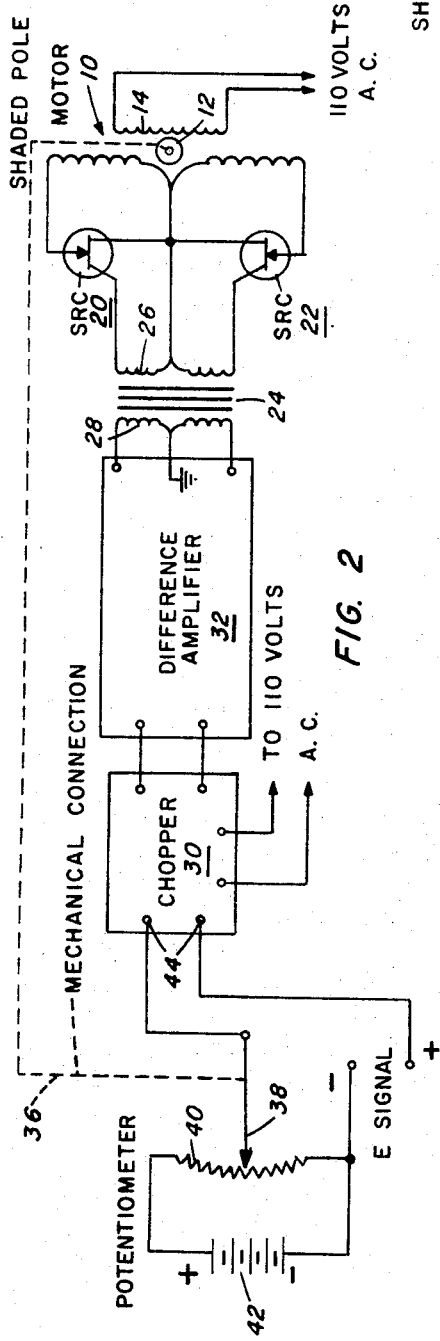
FIG. 2 is a schematic diagram of the motor control of FIG. 1.

This requirement is fulfilled by synchronizing the trigger impulse with the AC supplied to the running coil 14 of the motor 10. With reference to FIG. 2, a chopper 30, which may be of any of the well-known types, is driven by the same 110 volt AC supply as the running coil 14 of the motor 10. This chopper 30 connects to the input of an amplifier 32, which, in turn, connects to the primary 28 of the pushpull transformer 24. Thus, a DC signal E is presented to the input terminals 44 of the chopper 30 and it is modulated to a pulse form of the same polarity for the amplifier 32 to amplify, only one SCR will fire and short a shading winding, and the motor 10 will consequently rotate. A DC signal of opposite polarity will cause reverse opertion of the motor 10.

In the present example the resulting firing of one or the other SCR's 20 or 22 and movement of the armature 12 is fed back by a mechanical connection 36 to the arm 38 of a potentiometer 40 having a standard cell 42.

Figure 1:
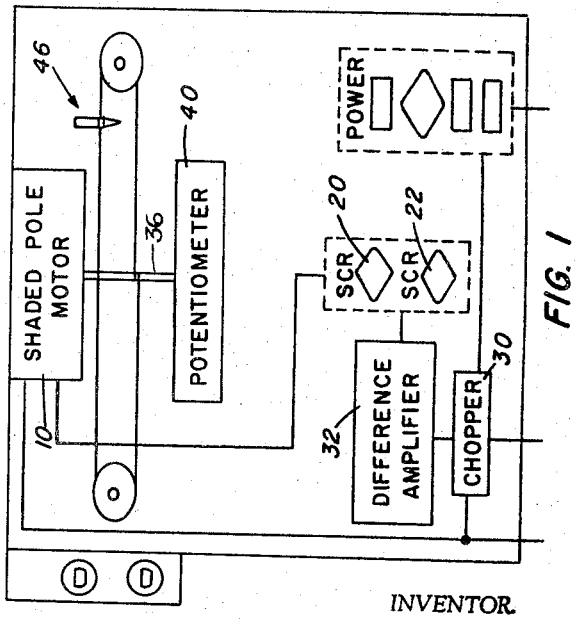
FIG. 1 is a block diagram of a typical motor control arrangement embodying features of this invention.

The voltage developed by this potentiometer 40 is connected in series opposition to the signal E and the combined voltages fed to the input terminals 44 of the chopper 30. The transformer 24 is poled so as to fire the SCR 20 or SCR 22 whichever results in a rotation of motor 10 which tends to equalize the voltages of the potentiometer 40 with the signal E. Consequently, the position of the armature 12 can be used to indicate the potential of the signal E by means of a linkage and pen 46 as shown in FIG. 1. Other uses will suggest themselves to those skilled in the art.

The superiority of the above described control is manifested in the positive manner in which the motor 10 responds and stops without coasting. It is believed this is because there is a braking action on the armature of motor and displaced 90 degrees between the shading windings 16 and 18. This is occurring at the power line frequency and so is very rapid in action.

Figure 4:
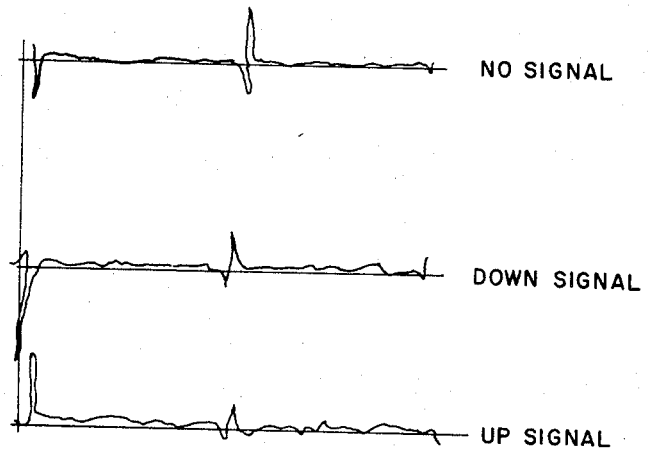
FIG. 4 is a series of oscillograms showing the silicon controlled rectifier (SCR) drive signal.
Figure 5:
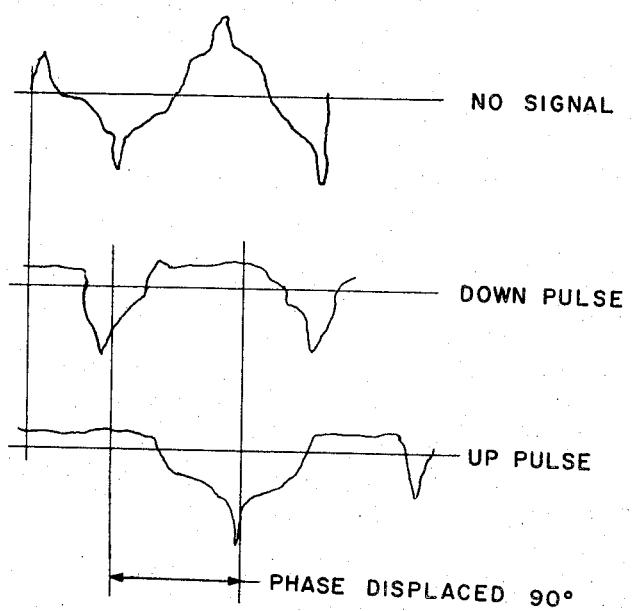
FIG. 5 is a series of oscillograms of the output signal to the motor control windings.

FIGS. 4 and 5 depict the wave forms at the gate and anode respectively of the SCR's as used in the novel circuit.

Obviously, many modifications and variations of the present invention are possible in light of the above teachings. It is, therefore, to be understood that within the scope of the appended claims the invention may be practiced otherwise than as specifically described.

What is claimed is:
1. A proportional motor control arrangement, comprising, an AC motor having an induction type armature, a running coil, and a forward shading coil and a reverse shading coil, an AC power source for said running coil, a first silicon controlled rectifier having an anode and a cathode connected directly to said forward shading coil, and a second silicon controlled rectifier having an anode and a cathode connected directly to said reverse shading coil, with a common cathode connection between said rectifiers, gating means for each rectifier, a push-pull transformer having a center tapped output winding, said center tap connected to said common cathode connection, each opposite end of said output winding being connected to a respective gating means, amplifier means coupled to said transformer, a control voltage of a frequency like said AC source and of reversible polarity connected to said amplifier, whereby a selected polarity will gate only one of said rectifiers and short circuit one of said shading coils causing said AC motor to run in one direction and a short circuiting on the other of said shading coils will cause said AC motor to run in the reverse direction.

References Cited

UNITED STATES PATENTS

| 2,458,701 | 1/1949 | Greenough | 318—208 |
| 2,519,562 | 8/1950 | Glass et al. | 318—208 |
| 2,783,423 | 2/1957 | Streater et al. | 318—208 X |
| 2,924,763 | 2/1960 | Cibelius | 318—208 |
| 3,046,461 | 7/1962 | Luppold | 318—208 |
| 3,202,903 | 8/1965 | Riebs | 318—208 X |
| 3,231,804 | 1/1966 | Weisgerber | 318—208 |
| 3,262,034 | 7/1966 | Thoresen | 318—208 X |

ORIS L. RADER, *Primary Examiner.*

G. RUBINSON, *Assistant Examiner.*